G. C. LEHR.
VEHICLE TIRE.
APPLICATION FILED MAY 5, 1919.
1,353,921.  Patented Sept. 28, 1920.
Fig. 1
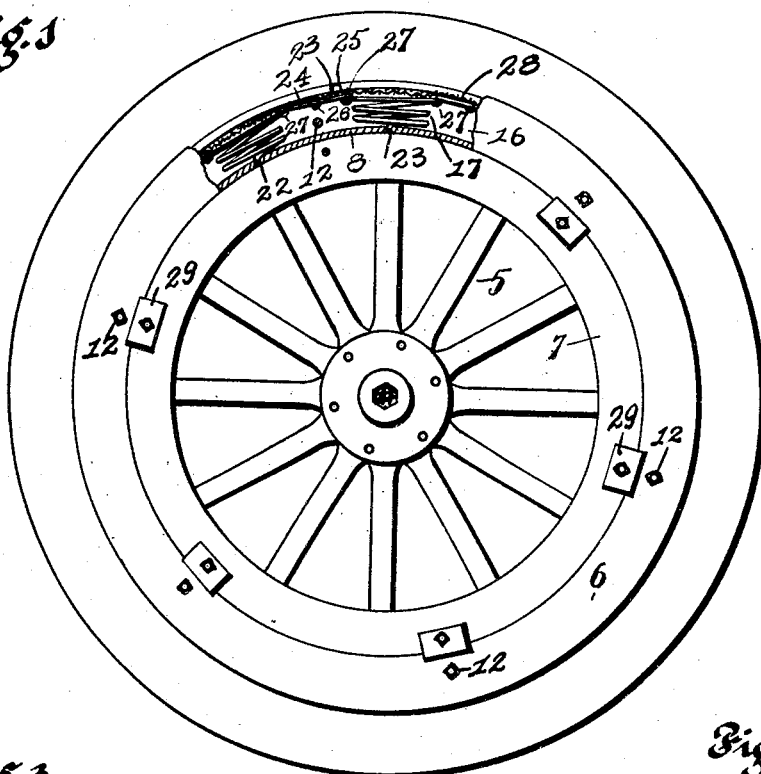
Fig. 2
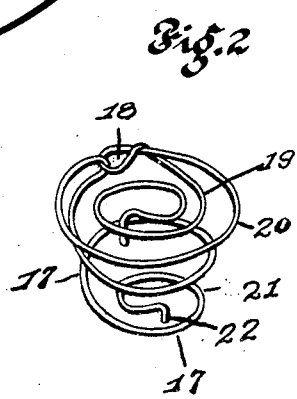
Fig. 3
Fig. 4
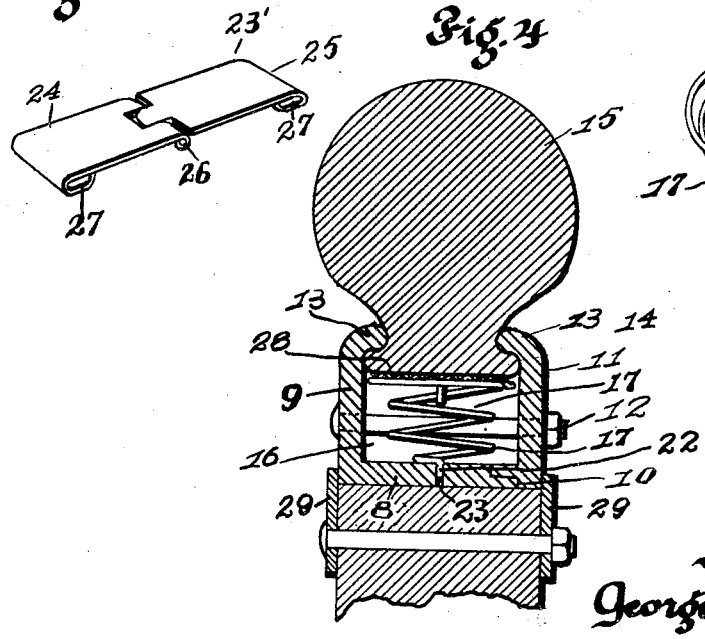
Inventor
George C. Lehr
by Edward E. Longan
Atty.

UNITED STATES PATENT OFFICE.

GEORGE C. LEHR, OF ST. LOUIS, MISSOURI.

VEHICLE-TIRE.

1,353,921.　　　　Specification of Letters Patent.　　Patented Sept. 28, 1920.

Application filed May 5, 1919. Serial No. 294,963.

*To all whom it may concern:*

Be it known that I, GEORGE C. LEHR, a citizen of the United States, and resident of the city of St. Louis and State of Missouri, have invented certain new and useful Improvements in Vehicle-Tires, of which the following is a specification containing a full, clear, and exact description, reference being had to accompanying drawings, forming a part thereof.

My invention relates to new and useful improvements in vehicle tires and has for its primary object a solid rubber tire secured in a demountable rim, and resilient means placed on the inner surface of the rubber tire and inclosed within the rim so that virtually the pneumatic action will be had.

A further object is to provide a vehicle tire with a demountable rim, the tread of the tire being constructed of solid rubber and secured within the demountable rim, and resilient means interposed between the base of the rubber tire and the rim so as to give practically a pneumatic action and at the same time prevent foreign substance from interfering with the resiliency of the tire.

I am aware that solid rubber tires have been made which have openings or ribs so as to provide additional resiliency, but it has been found that these openings will become clogged with dirt and destroy the additional resiliency imparted by the ribs and therefore do not give the required amount of resiliency desired in a motor vehicle.

In the drawings:

Figure 1 is a side elevation of a vehicle wheel partially broken away with my device attached.

Fig. 2 is a perspective view of one of the springs made use of.

Fig. 3 is a perspective view of the spring binding members.

Fig. 4 is an enlarged section taken through one of the spring members.

In the construction of my device, I provide a vehicle wheel 5 which is of the ordinary artillery type and on the felly of this wheel is placed my demountable tire, this tire being composed of a rim 6 which is demountably secured on the felly 7 of the wheel 5, this demountable feature being well-known in the automobile trade and is not described in detail.

The demountable rim is provided with a base 8 and a wall 9, the base and wall being formed integral. To the edge 10 of the base 8 is secured a wall or flange 11, the securing of this wall or flange being accomplished by means of bolts 12. The walls 9 and 11 are provided with inturned edges 13 which serve to grip the bead 14 formed on both sides of the base of the tire 15, this tire being constructed of solid rubber.

The base 8 and the walls 9 and 11 form a channel 16 in which coiled springs 17 are seated, these coiled springs each being provided with an eye 18 on its outer portion. This eye is formed by the end 19 of the spring being bent over the coil 20. The free end or portion after the eye is formed is coiled as illustrated in Fig. 2, so as to leave practically a flat surface on the outer end of the spring, this flat surface being in the same plane as the coil 20. The end 21 is passed through the eye 18, see Fig. 2, and the remainder of the spring formed therefrom.

At the inner end of this spring, I provide a projection 22 which fits into the bore 23 formed in the base 8 of the rim. For securing the springs 17, I provide a series of hinged connections 23′, these connections being composed of plates 24 and 25 which are hingedly connected together at the point 26, see Figs. 1 and 3, their ends 27 being bent around the coil 20 so as to secure the springs together and with the same form an endless chain around the rim. After the springs 17 have been secured in place in the rim, a strip of fabric 28 is placed over the same and over this strip the solid tire 15 is secured.

My object in placing this fabric strip over these springs and their connections is to prevent the tire 15 from becoming seated on the springs or in other words, prevent the embedding of the wire in the rubber.

When it is desired to remove the tire or replace any one of the springs which may have become broken, it is only necessary to release the securing plates 29 as is done in any demountable rim and a new rim together with the tire and resilient means placed on the machine.

By the use of my device, a worn or broken tire can be easily replaced.

Having fully described my invention, what I claim is:

A vehicle tire comprising a plurality of spiral springs having helical ends so as to form substantially flat surfaces and arranged radially, hinged connections for connecting each spring with the adjacent springs at their outer ends so as to form substantially a ring, a solid rubber tire surrounding the springs and their connections, a bead formed on each side of the tire adjacent the springs, a strip of fabric interposed between the springs and the tire, centrally located projections located on the inner ends of the springs in combination with a split demountable rim, in which said projections and springs are seated.

In testimony whereof, I have signed my name to this specification, in presence of two subscribing witnesses.

GEORGE C. LEHR.

Witnesses:
 E. M. SCHUCHARDT,
 HATTIE LEHR.